(12) United States Patent
Pedrotti

(10) Patent No.: US 11,221,031 B1
(45) Date of Patent: Jan. 11, 2022

(54) JOINT MEMBER FOR PANELS

(71) Applicant: ESSEPI S.R.L., Cavedine (IT)

(72) Inventor: Silvio Pedrotti, Cavedine (IT)

(73) Assignee: ESSEPI S.R.L., Cavedine (IT)

(*) Notice: Subject to any disclaimer, the term of this patent is extended or adjusted under 35 U.S.C. 154(b) by 0 days.

(21) Appl. No.: 17/071,743

(22) Filed: Oct. 15, 2020

(51) Int. Cl.
*F16B 5/00* (2006.01)
*E04C 2/00* (2006.01)
*E04B 2/00* (2006.01)
*E04C 2/24* (2006.01)
*F16B 5/02* (2006.01)

(52) U.S. Cl.
CPC .............. *F16B 5/0084* (2013.01); *E04C 2/24* (2013.01); *E04C 2/46* (2013.01); *F16B 5/0208* (2013.01); *E04C 2002/004* (2013.01)

(58) Field of Classification Search
CPC ........ F16B 5/0084; F16B 5/0208; E04C 2/24; E04C 2/46; E04C 2002/004; E04C 2/384; E04C 2/283; E04C 2/30; E04B 1/043; E04B 1/4114
USPC .......................... 52/747.12, 71, 582.1, 582.2
See application file for complete search history.

(56) References Cited

U.S. PATENT DOCUMENTS 2,863,185 A * 12/1958 Riedi .................... E04B 1/6154
403/297
3,310,917 A * 3/1967 Simon ..................... F16B 5/002
52/91.1

(Continued)

FOREIGN PATENT DOCUMENTS

| EP | 0072139 B1 | 1/1986 |
| JP | 2019011631 A | 1/2019 |
| KR | 20030006886 A | 1/2003 |

*Primary Examiner* — Beth A Stephan
(74) *Attorney, Agent, or Firm* — Pearne & Gordon LLP

(57) ABSTRACT

A joint member (1) for mechanically connecting a first panel (51) and a second panel (52) to each other has a body (20) equipped with at least four connecting portions (21, 22, 23, 24) each having a respective seat (31, 32, 33, 34) which receives a fixing element (5). The seats (31, 32, 33, 34) are spaced from each other and, in a plan view of the joint member (1), are positioned at the vertices of a quadrilateral. A first (21) and a second (22) of said connecting portions form a first pair of connecting portions, to be fixed to the first panel (51), whereas a third (23) and a fourth (24) of said connecting portions form a second pair of connecting portions, to be fixed to the second panel (52). Each connecting portion (21, 22, 23, 24) has a first face (41), which is facing the respective panel (51, 52) in use, and a second face (42), which is on an opposite side to the first face (41). Each seat (31, 32, 33, 34) is, or comprises, a through hole which extends between the first face (41) and the second face (42). The second face (42) of the first connecting portion (21) and the second face (42) of the third connecting portion (23) are on a same first side (25) of the body (20); the second face (42) of the second connecting portion (22) and the second face (42) of the fourth connecting portion (24) are on a same second side (26) of the body (20), opposite to the first side (25). An assembly (57) comprises a first panel (51), a second panel (52), at least one joint member (1) and a plurality of fixing elements (5). A wall (58) for a building or a floor for a building is formed by a plurality of panels (51, 52, 53) and comprises at least said assembly (57).

19 Claims, 10 Drawing Sheets

(56) References Cited

U.S. PATENT DOCUMENTS

| | | | | |
|---|---|---|---|---|
| 3,416,275 A * | 12/1968 | Van Loghem | E04B 2/707 | |
| | | | 52/282.3 | |
| 3,512,819 A * | 5/1970 | Gillingwater | E04B 1/6158 | |
| | | | 52/461 | |
| 3,557,507 A * | 1/1971 | Wilder | E04B 2/56 | |
| | | | 52/404.1 | |
| 3,640,039 A * | 2/1972 | McKee | F16B 5/0052 | |
| | | | 52/281 | |
| 3,641,730 A * | 2/1972 | Meckstroth | F16B 5/0024 | |
| | | | 52/586.2 | |
| 4,484,430 A | 11/1984 | Rossman | | |
| 5,058,333 A * | 10/1991 | Schwartz | E04D 3/355 | |
| | | | 52/73 | |
| 5,179,810 A * | 1/1993 | Gename | E04B 2/7409 | |
| | | | 160/135 | |
| 5,349,798 A * | 9/1994 | Gross | E04C 1/40 | |
| | | | 52/309.12 | |
| 5,934,039 A * | 8/1999 | Guy | E04B 2/18 | |
| | | | 52/747.12 | |
| 6,014,849 A * | 1/2000 | Yonemura | E03F 3/04 | |
| | | | 404/49 | |
| 6,189,282 B1 * | 2/2001 | VanderWerf | E04B 2/14 | |
| | | | 52/582.1 | |
| 7,152,383 B1 * | 12/2006 | Wilkinson, Jr. | E04B 1/6145 | |
| | | | 52/581 | |
| 7,418,805 B2 * | 9/2008 | Tan | E04B 2/7425 | |
| | | | 52/234 | |
| 7,815,391 B2 * | 10/2010 | Kauppila | F16B 9/052 | |
| | | | 403/367 | |
| 9,206,599 B2 * | 12/2015 | Aube | E04B 2/8641 | |
| 2003/0201075 A1 * | 10/2003 | Fricano | E04B 2/7437 | |
| | | | 160/135 | |
| 2004/0123548 A1 * | 7/2004 | Gimpel | E04B 1/6179 | |
| | | | 52/582.1 | |
| 2010/0064619 A1 * | 3/2010 | Huang | E04B 2/7437 | |
| | | | 52/582.2 | |
| 2013/0239507 A1 * | 9/2013 | Fleming, III | B32B 3/10 | |
| | | | 52/582.1 | |
| 2015/0368915 A1 | 12/2015 | Kang | | |

* cited by examiner

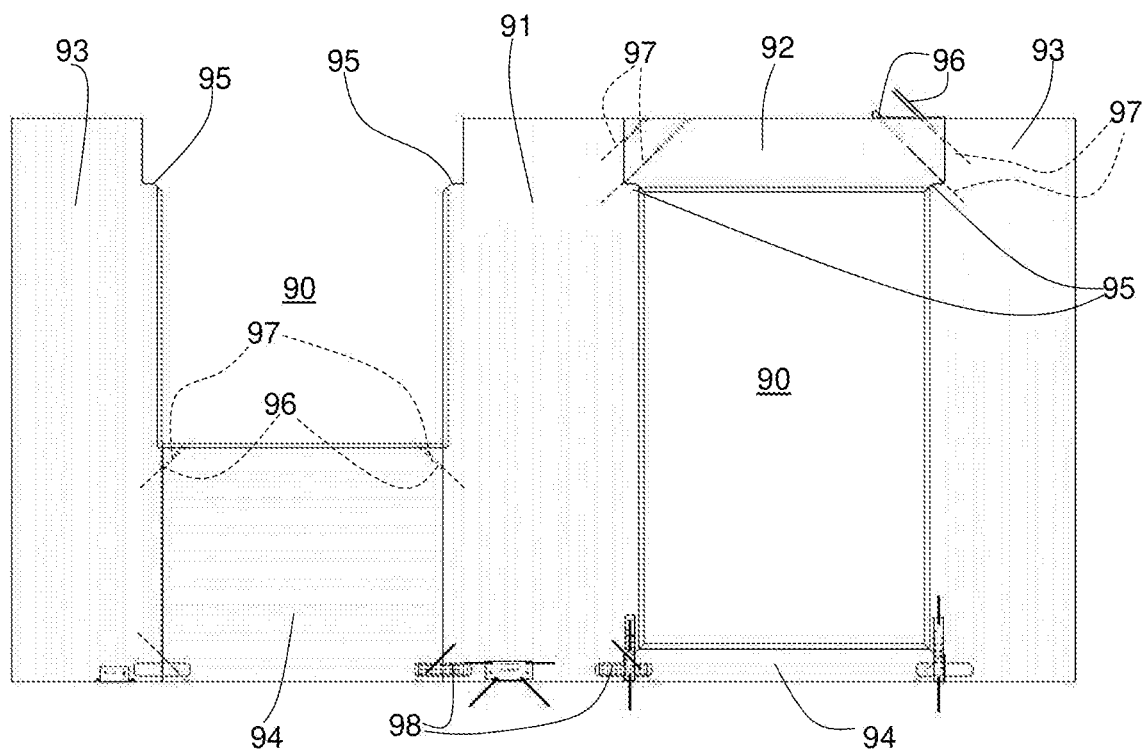
FIG. 1A (prior art)
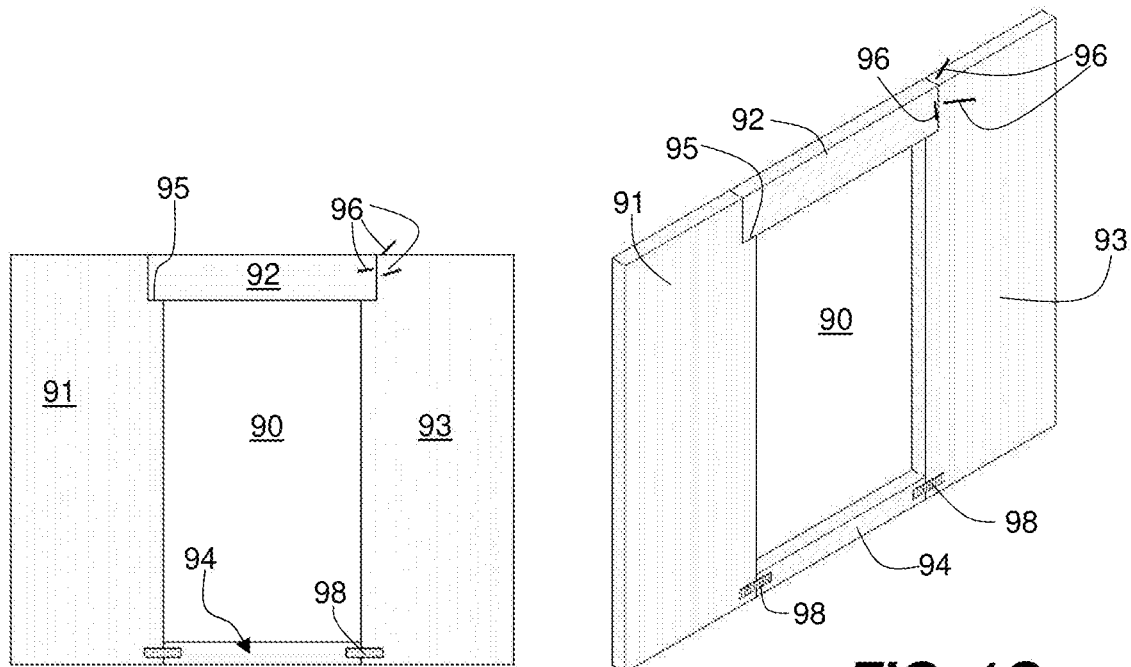
FIG. 1B (prior art)
FIG. 1C (prior art)

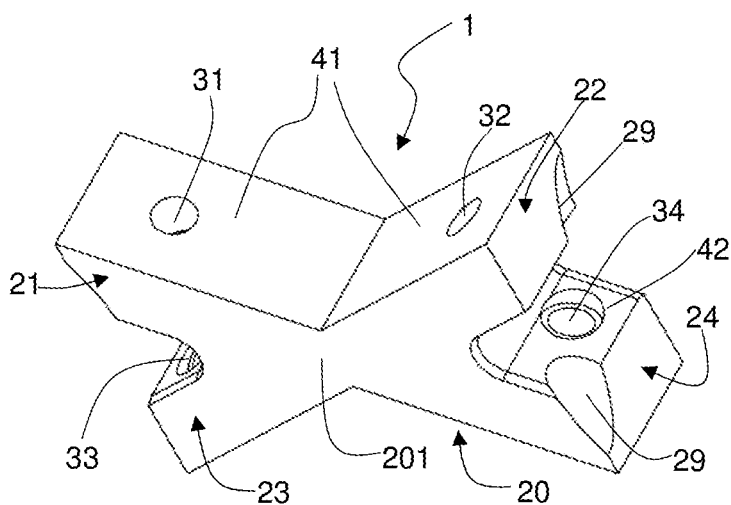
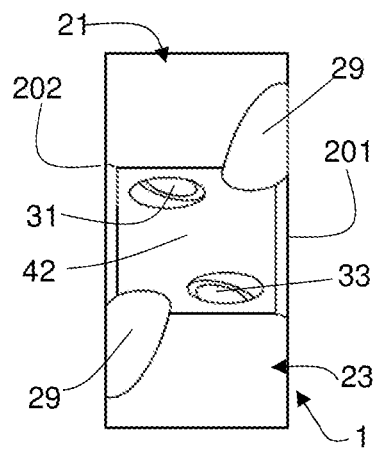
FIG. 2  FIG. 3
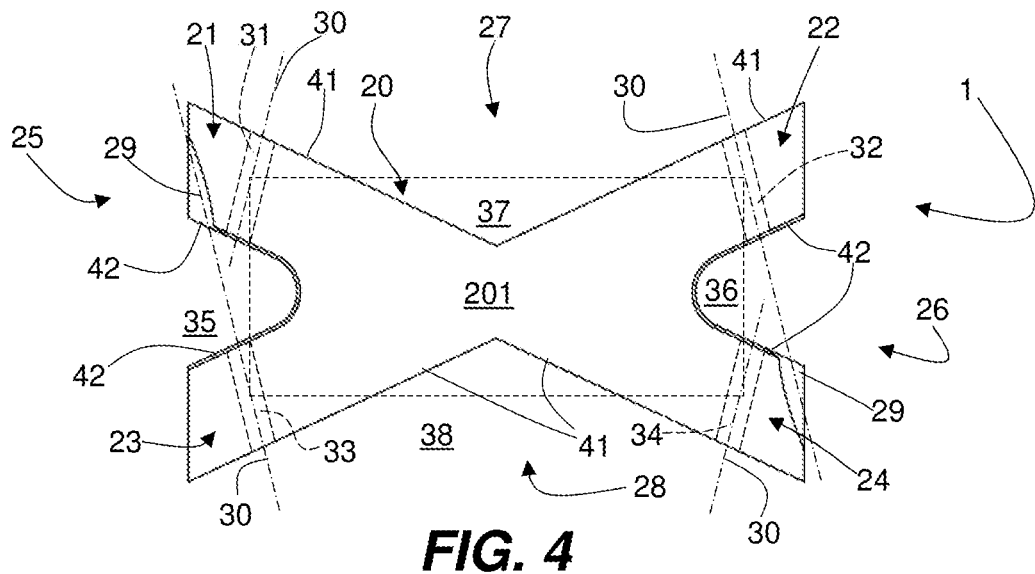
FIG. 4
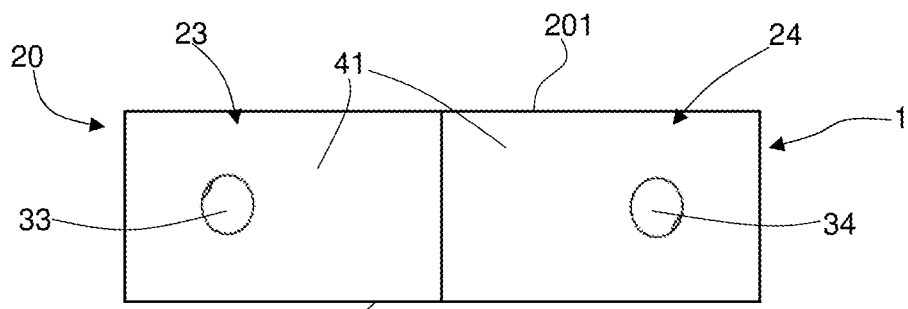
FIG. 5

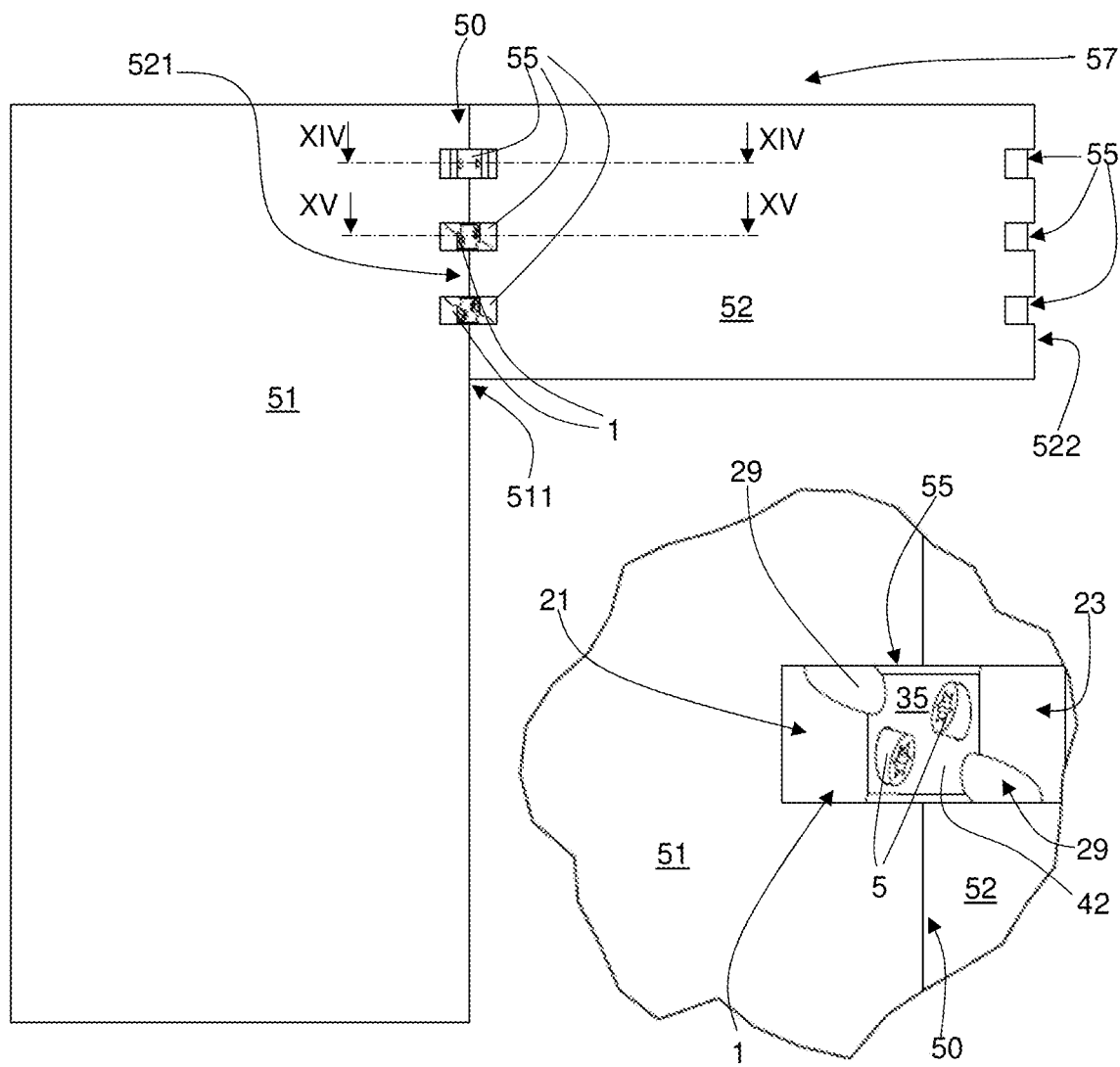
FIG. 12
FIG. 13
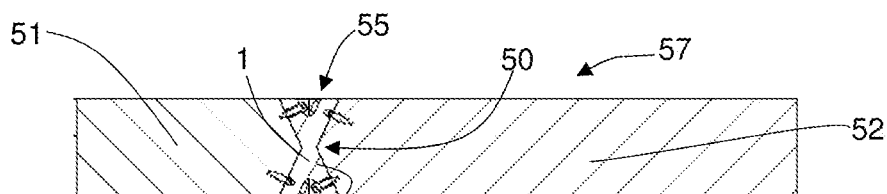
FIG. 14
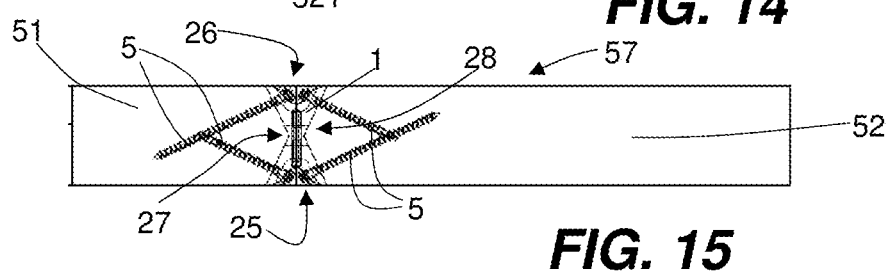
FIG. 15

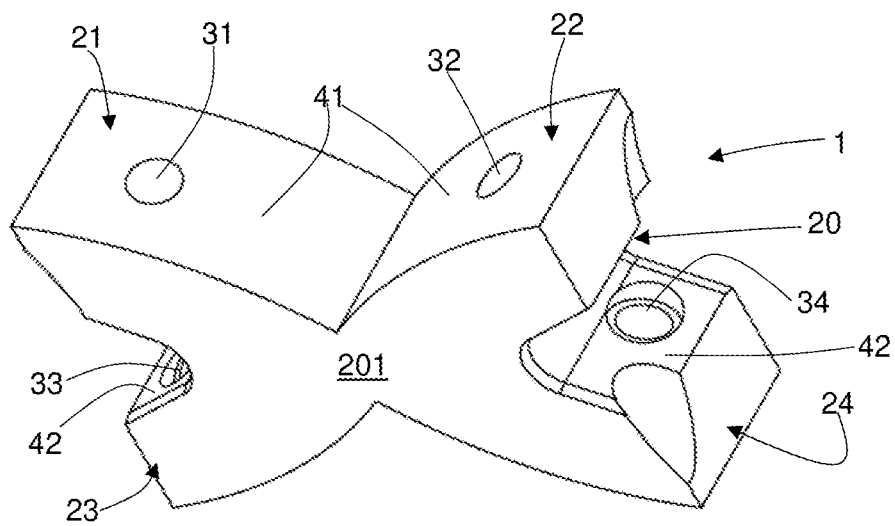
FIG. 17
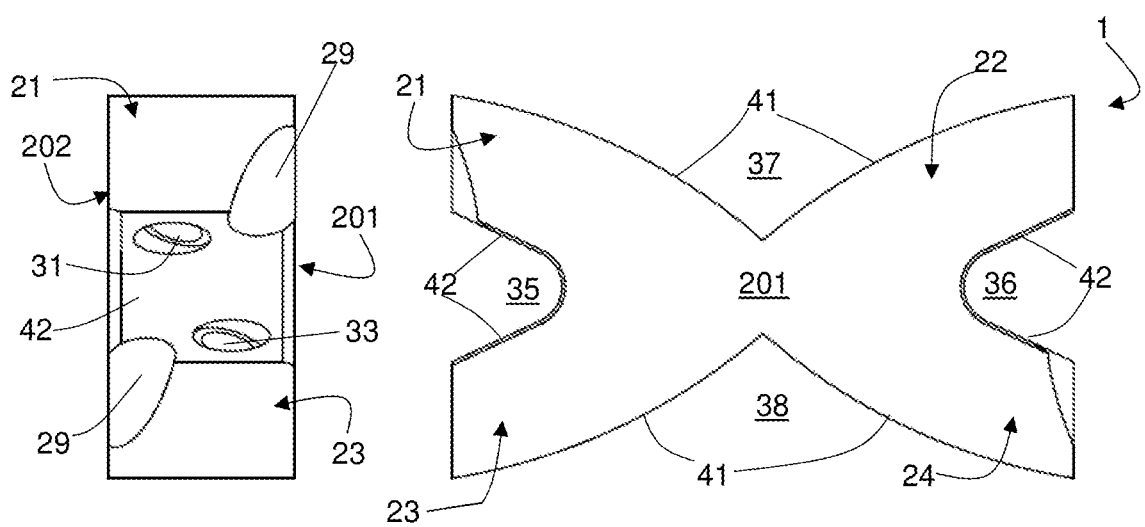
FIG. 18
FIG. 19
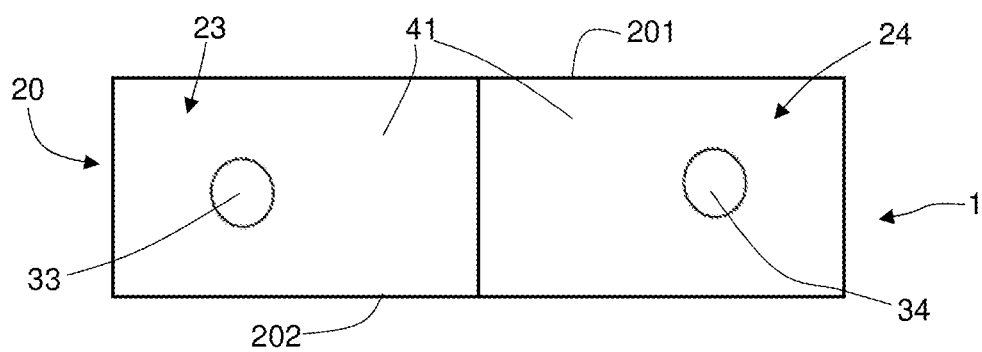
FIG. 20

JOINT MEMBER FOR PANELS

CROSS-REFERENCE TO RELATED APPLICATIONS

The present application claims the benefit of Italian Patent Application No. 102019000004815 filed on Mar. 29, 2019, and of European Patent Application No. 20166013.1 filed on Mar. 26, 2020, which are incorporated herein by reference in their entirety.

DESCRIPTION

This disclosure relates in general to the sector of constructions and in particular the subject-matter of this disclosure is a joint member for panels. One specific field of use of this disclosure is the building sector, in particular for wooden buildings.

According to one method currently used, the walls of a wooden building are made using prefabricated panels, made of wood (for example multi-layered wood or X-LAM type laminated wood panels), which are installed by positioning them vertically and joining them to each other. Since the width of each panel is limited by the production and transportation needs involved and therefore the width of the panel is less than the desired width of the wall, each wall is formed by a plurality of panels alongside each other so as to obtain the desired width.

The mechanical connections between the panels and the foundation base, and between the panels themselves, are made for example by metal brackets or plates to be fixed to the faces of the panels and by fixing screws with various inclinations according to requirements.

In general there is the need for alternative solutions which allow the panels to be joined together effectively in structural terms and which, if possible, minimise the manpower necessary for assembling them during installation and the risk of assembling errors or imperfections.

In particular, the prior art methods involve drawbacks regarding the assembling of wooden walls in which there must be an opening for a door or for a window. That opening is laterally delimited by two lateral panels, which act as uprights, and is delimited at the top by a panel which acts as a crosspiece or architrave and which is constrained to the two lateral panels. The lateral panels hold the upper panel spaced from the ground and discharge to the ground the load that the structures above apply on the upper panel.

Therefore, the mechanical connection between the lateral panels and the upper panel is required to be strong, suitable for transferring loads and carefully made.

One prior art method involves shaping the upper portion of the sides of the lateral panels in such a way as to create supports for the upper panel. Moreover, the upper panel is mechanically connected to the lateral panels by fixing screws inserted from above into holes made in the thickness of the panels and having an inclination of approximately 45° relative to the vertical direction. The screws fix the upper panel to the lateral panels. See FIG. 1A with regard to this.

At least in the case of an opening for a window, the opening is also delimited at the bottom by a lower panel which in turn is fixed to the lateral panels by screws inserted into holes made in the thickness of the panels, at approximately 45° relative to the vertical direction.

One drawback of this prior art method is that the precision required in making holes for the fixing screws makes it difficult to prepare them in advance before assembling: indeed the holes affect both the lateral panel and the panel to be fixed and must precisely fit together in the panels during installation. Consequently, in order to avoid risks of lack of alignment during assembling, the holes are usually made during installation, after the upper panel has been positioned on the supports. Making the holes and positioning the screws require working from above, which may be very awkward for operators. Moreover, the holes are long holes which, starting from the top, must pass through the height of the upper panel, therefore particular care by the operators is required in order to make them correctly during installation. Furthermore, the lateral panel shaping to create supports and the upper panel shaping to match, which are operations to be performed at the factory, may be at risk of working errors which are difficult to correct during installation.

In variants of the prior art method, the fixing screws may be positioned differently: for example they may be inserted not from above but obliquely from the faces of the panels, or from above but with a different angle. In place of the fixing screws described above, it is possible to produce different fixing using pierced flat plates to be fixed to the faces of the panels, straddling the face of one panel and the face of the other panel alongside it. It should be noticed that all of these prior art methods have the disadvantage that the obtained result greatly depends on the professional expertise of the operators and on the precision of their assembling work during installation. For example, holes made with incorrect inclinations or in unsuitable positions may make the connection by fixing screws much weaker than expected. Therefore, the result of an earthquake resistance test performed on a wall specially built in the factory with the due care is in no way representative of the effective earthquake resistance behaviour of a corresponding wall installed: if the operators have not been precise in their work, the wall installed might not be capable of withstanding an earthquake which, according to the design and testing, it should have been able to withstand.

In this context, the technical purpose of this disclosure is to provide a joint member for panels which allows the panels to be mechanically connected to each other with methods which overcome the drawbacks of the prior art, or at least to provide a joint member for panels which offers an alternative solution to the currently known solutions.

The technical purpose specified and the aims indicated are substantially achieved by a joint member for panels according to claim 1. Particular embodiments are defined in the corresponding dependent claims. This disclosure also relates to an assembly (in particular a wall of a building, or a floor of a building) comprising panels which are connected to each other by joint members according to this disclosure.

According to one aspect of this disclosure, the joint member has a body equipped with at least four connecting portions (or fixing portions) each having a respective seat intended to receive a fixing element. In use, each seat represents a point at which the joint member is fixable to a panel and the respective connecting portion is a body part which is configured for receiving the fixing element and for mechanically operating in conjunction with the latter and with the panel. The seats are spaced from each other and, in a plan view of the joint member, are positioned at the vertices of a quadrilateral. The connecting portions are fixable in pairs to the respective panels: in use, the fixing member is positioned in a position interposed between the first panel and the second panel, in a joint region in which a side or edge of the first panel is alongside a side or edge of the second panel; two connecting portions are fixed to the first panel; the other two connecting portions are fixed to the second panel. The joint member is shaped in such a way that its seats for the fixing elements are located, in pairs, on opposite sides of its body and those sides are located on opposite faces of the assembly formed by the panels which are alongside each other. That is useful for facilitating assembling operations: the sides of the joint member remain accessible when the latter is positioned between the panels and therefore the operator can easily position the fixing elements in the seats, if necessary also making the corresponding holes in the panels.

It should be noticed that these operations can be performed by acting on the opposite faces of the assembly, for example on the vertical faces of the wall, not from above as in the prior art. This is easier for the operator.

Moreover, the holes to be made during installation have a limited depth, determined by the length (variable according to requirements) of the fixing element to be received. They do not extend at all from the top of the upper panel and for a significant stretch of its height, as in contrast is necessary for the prior art shown in FIG. 1A. This greatly simplifies the operations to be performed during installation.

Furthermore, unlike the prior art mentioned above, the lateral panel shaping to create the supports and the upper panel shaping to match can be completely avoided: indeed the joint member is usable for joining panels with straight sides.

In particular, in the sides or edges of the panels hollows or recesses can be made, in the thickness of the respective panel, for receiving a corresponding part of the joint member. The joint member may be completely housed in those hollows, without projecting from the faces of the assembly and without constituting a thickness between the sides or edges.

The hollows or recesses can be easily made by milling and in particular can be made in the factory, thereby minimising the operations to be performed during installation.

It should be noticed that the simplification of the operations to be performed during installation greatly reduces both the possibility of errors by the operators, and the influence of their professional expertise and precision on the obtained result. The risk of difference between the wall installed and the design specifications is much reduced. Therefore, the use of a joint member according to this disclosure is useful for ensuring that the wall installed has, in structural and earthquake resistance terms, characteristics which are reproducible and corresponding to those of the design. This allows to disengage the obtained result as far as possible from the margin of uncertainty due to the work of the operators who assembled the wall during installation.

It should be noticed that what has been described and commented on with reference to a wall also applies with reference to a floor.

In some embodiments in which the connecting portions intended for the same panel between them form a housing, it is possible to obtain substantial interlocking between the joint member and the panels, by suitably sizing and shaping the joint member and the hollows. That makes the connection even more secure and stronger, in addition to what can be obtained by the fixing elements, and may allow considerable earthquake resistance performance. One specific field of use of the joint member according to this disclosure is that of wooden structures, in which the joint member is usable for multi-layered wood or laminated wood panels, in particular of the X-LAM or CLT (Cross Laminated Timber) type.

In this field, particular advantage may be gained from an embodiment of the joint member in which, for each pair of connecting portions which are fixable to the same panel, the seats for the fixing elements have central longitudinal axes which are slanting (i.e., they are not in a same plane) relative to each other and have projections which, in a view orthogonal to the plan view of the joint member, diverge in the direction coming out of the faces which face the same panel.

Indeed, compared to configurations with fixing elements which are substantially coplanar, thanks to this configuration the fixing elements inserted into the panel affect a greater volume of the panel, they involve a greater number of fibres of the wood and they more effectively distribute the stresses in a more extensive zone of the panel. Therefore, a very strong joint is obtained.

However, it should be noticed that the joint member according to this disclosure may be used for panels of any type and made of any material, not necessarily in the building sector.

Further features and advantages are more apparent in the following detailed description of several preferred, non-limiting embodiments of joint members for panels and of their use. Reference will be made to the accompanying drawings, in which:

FIG. 1A shows, in a front view, the making of a wooden wall according to the prior art;

FIGS. 1B and 1C respectively show a front view and a perspective view of a variant for making a wooden wall according to the prior art;

FIG. 2 shows a perspective view of a first embodiment of a joint member according to this disclosure;

FIG. 3 shows a view of one side of the joint member of FIG. 2;

FIG. 4 shows a plan view of the joint member of FIG. 2;

FIG. 5 shows a side view of the joint member of FIG. 2;

FIG. 12 shows a front view of the assembly of FIG. 10;

FIG. 13 shows an enlarged detail from FIG. 12;

FIG. 14 shows a cross-sectional view of a portion of the assembly of FIG. 10, in section along section line XIV-XIV in FIG. 12 at a joint member still without fixing elements;

FIG. 15 shows a cross-sectional view of a portion of the assembly of FIG. 10, in section along section line XV-XV in FIG. 12 at a joint member equipped with fixing elements;

FIG. 17 shows a perspective view of a second embodiment of a joint member according to this disclosure;

FIG. 18 shows a view of one side of the joint member of FIG. 17;

FIG. 19 shows a plan view of the joint member of FIG. 17;

FIG. 20 shows a side view of the joint member of FIG. 17;

Figure 6:
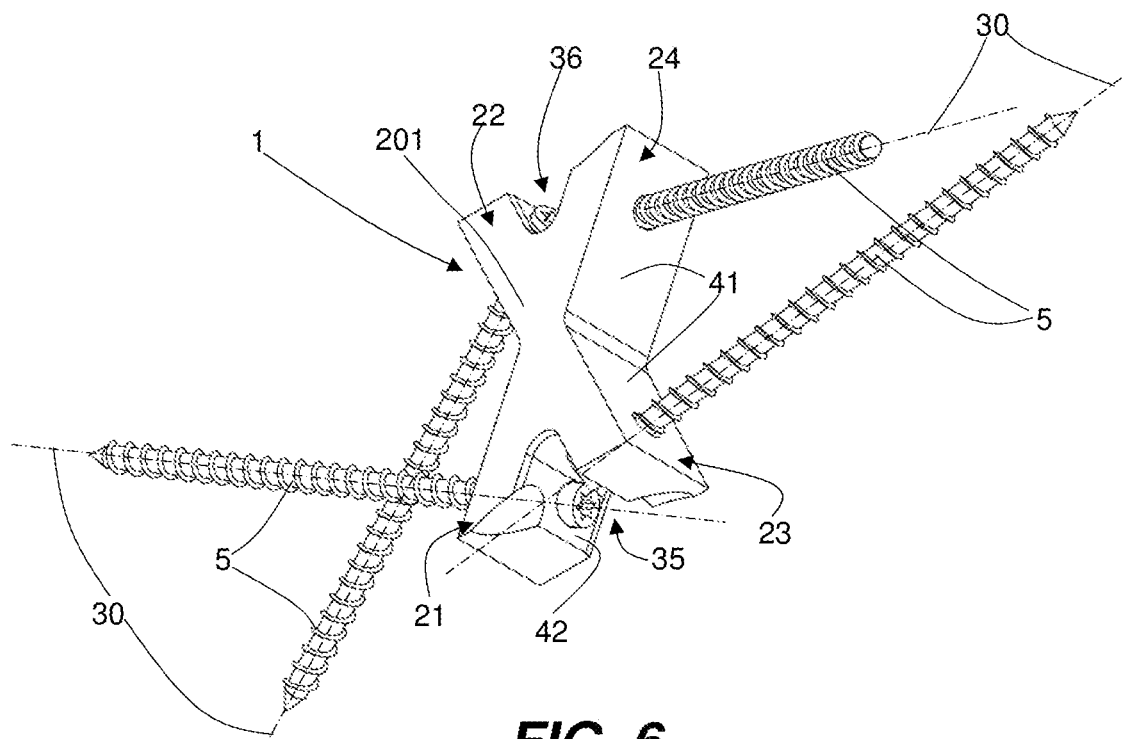
FIG. 6 shows a perspective view of the joint member of FIG. 2, equipped with fixing elements.
Figure 7:
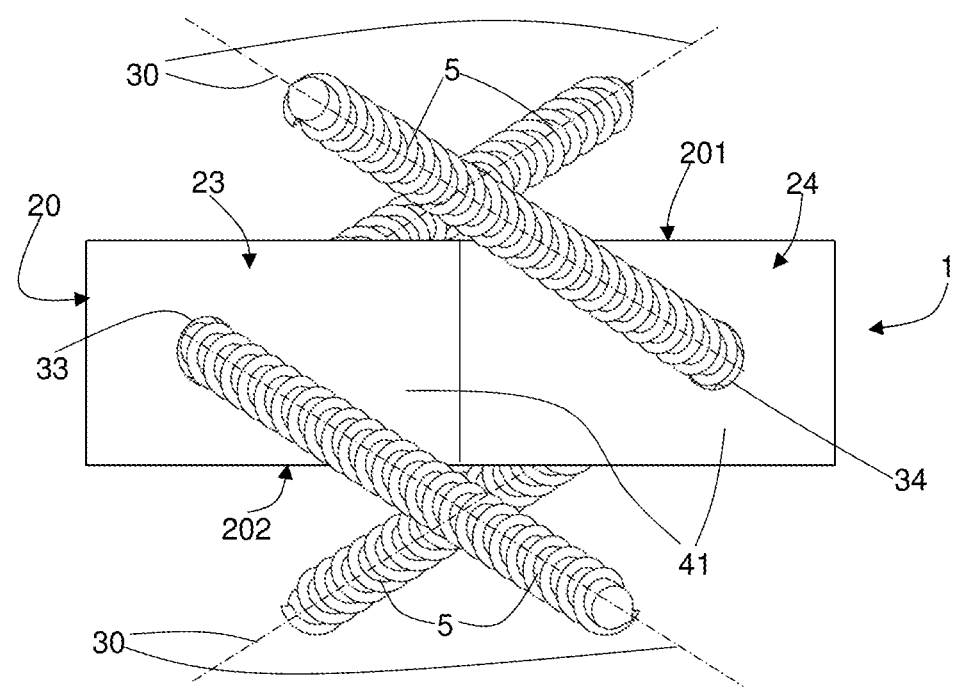
FIG. 7 shows a side view of the joint member of FIG. 2, equipped with fixing elements.
Figure 8:
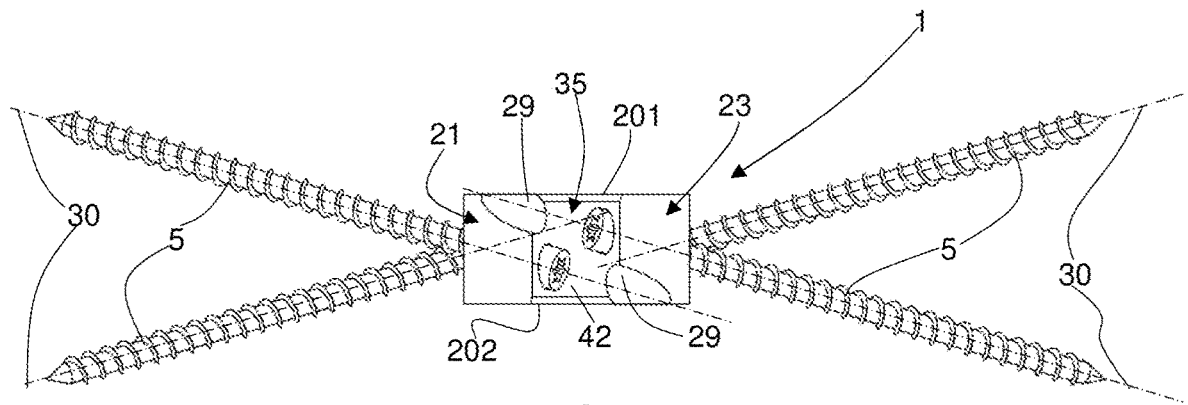
FIG. 8 shows a view of one side of the joint member of FIG. 2, equipped with fixing elements.
Figure 9:
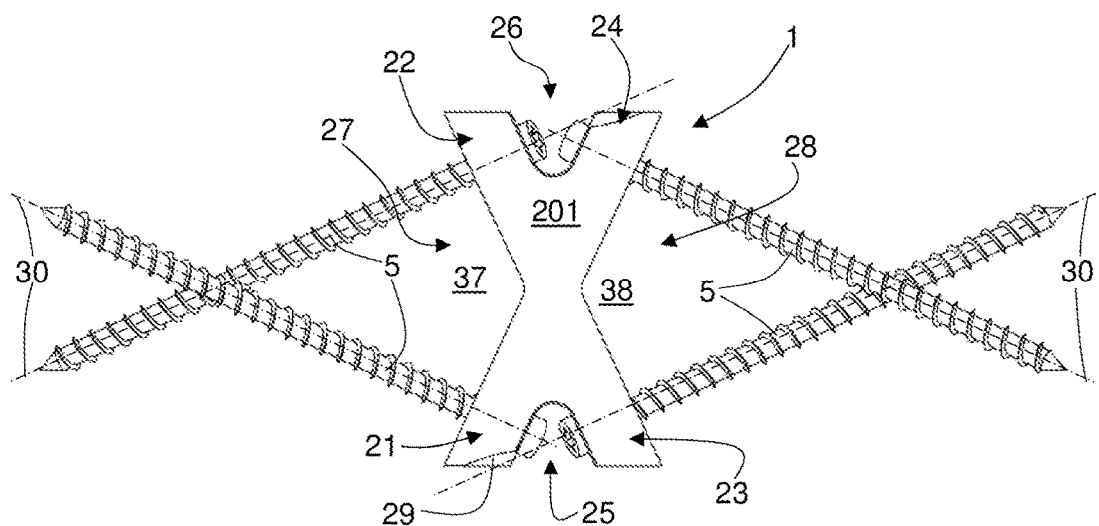
FIG. 9 shows a plan view of the joint member of FIG. 2, equipped with fixing elements.
Figure 10:
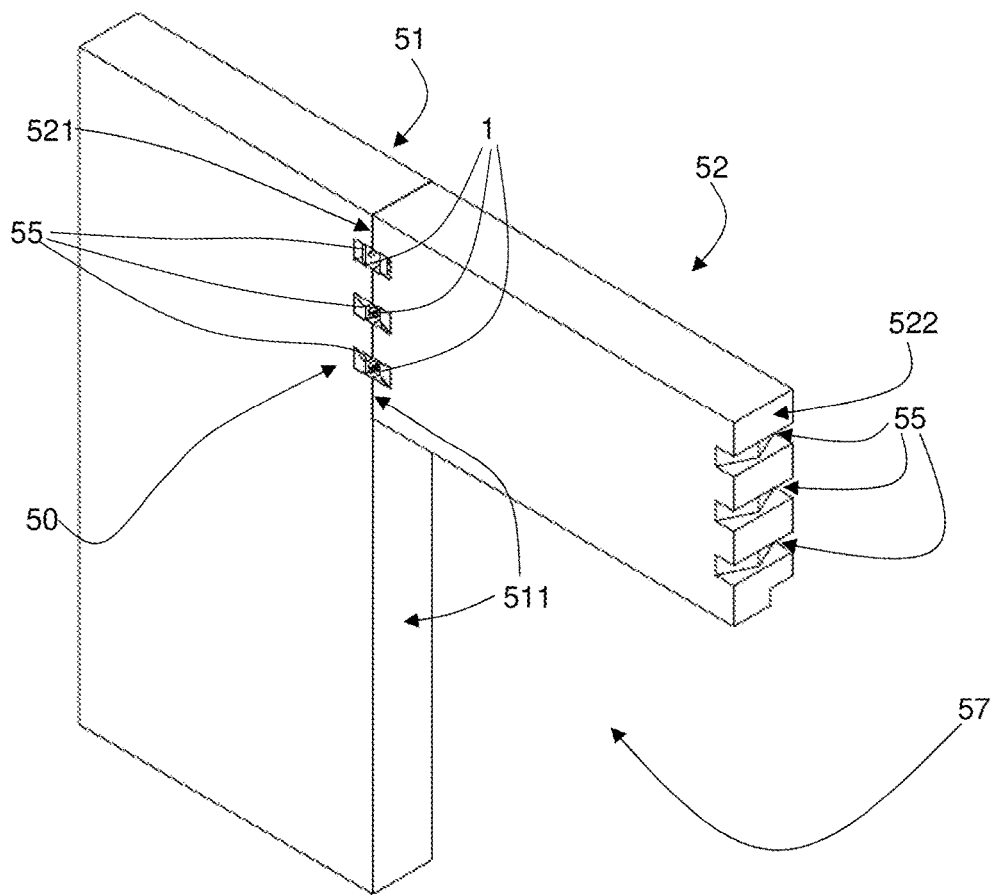
FIG. 10 shows a perspective view of an assembly comprising two panels connected by joint members of FIG. 2.
Figure 11:
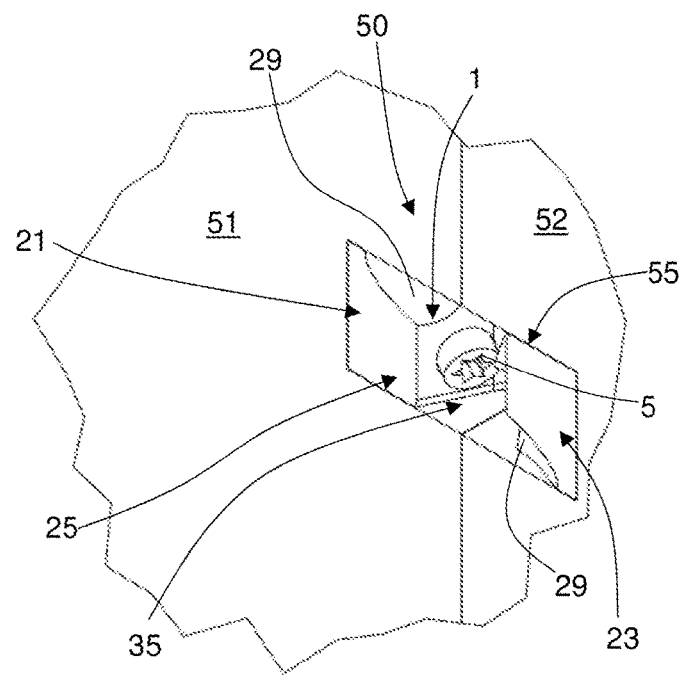
FIG. 11 shows an enlarged detail from FIG. 10.

With the sole purpose of putting this disclosure into context relative to a prior art in the wooden buildings sector, FIG. 1A shows a known method for making a wall made of wooden panels in which an opening for a door or for a window is required. The wall in FIG. 1A is shown during an assembling step.

Two lateral panels 91, 93, one upper panel 92 and if necessary one lower panel 94 delimit an opening 90 for a door or for a window.

Supports 95 are obtained in the sides of the lateral panels 91, 93 by shaping the self-same sides. The upper panel 92 is rested laterally on the supports 95.

The upper panel 92 is constrained to the lateral panels 91, 93 by screws 96: the screws 96 are inserted into holes 97, made at approximately 45° relative to the vertical direction. The holes 97 pass through the height of the upper panel 92 and penetrate the sides of the lateral panels 91, 93. The holes 97 are made and the screws 96 are inserted from above. The screws 96 inserted into the bottom of the holes 97 therefore connect the upper panel 92 to the lateral panels 91, 93. A similar fixing with screws 96 in inclined holes 97 is also used for the lower panel 94.

Alternatively, the panels may be constrained to each other by pierced flat plates 98. For example the lower panel 94 is constrained to the lateral panels 91, 93 also by said pierced flat plates 98, which are fixed with screws to the faces of the panels. Essentially, the flat plates 98 straddle the face of the panel 94 and the face of the other panel alongside 91, 93, parallel to the faces themselves.

In variants of the prior art method, the fixing screws 96 may be positioned differently: for example they may be inserted not from above but obliquely relative to the faces of the panels, or they may be inserted from above but with a different inclination or a different position. FIGS. 1B and 1C should be viewed with regard to this, since for illustrative purposes they show three screws 96 with different directions of insertion: two will be inserted into holes which start from the face of the upper panel 92 or of the lateral panel 93, the other will be inserted into a hole which starts from the top of the lateral panel 93 rather than from the top of the upper panel 92 as in FIG. 1A.

In FIGS. 1B and 1C the screws 96 are used for the upper panel 92, which is also laterally resting on supports 95 made in the lateral panels 91, 93, whilst flat plates 98 are used for the lower panel 94.

A first embodiment of a joint member for panels according to this disclosure is shown in FIGS. 2 to 9, where the joint member is labelled with the reference number 1. The joint member 1 is intended to mechanically connect a first panel and a second panel to each other. Basically, the joint member 1 is a structural connecting element, which is used for assembling a structure formed by panels and remains incorporated in the structure itself, constituting a joint which constrains the two panels to each other.

One method for use of the joint member 1 is illustrated in FIGS. 10 to 16, which show, by way of example, an assembly comprising panels joined to each other by joint members according to this disclosure. In those figures, a first panel is labelled with the reference number 51, a second panel is labelled with the reference number 52, a third panel is labelled with the reference number 53.

Figure 16:
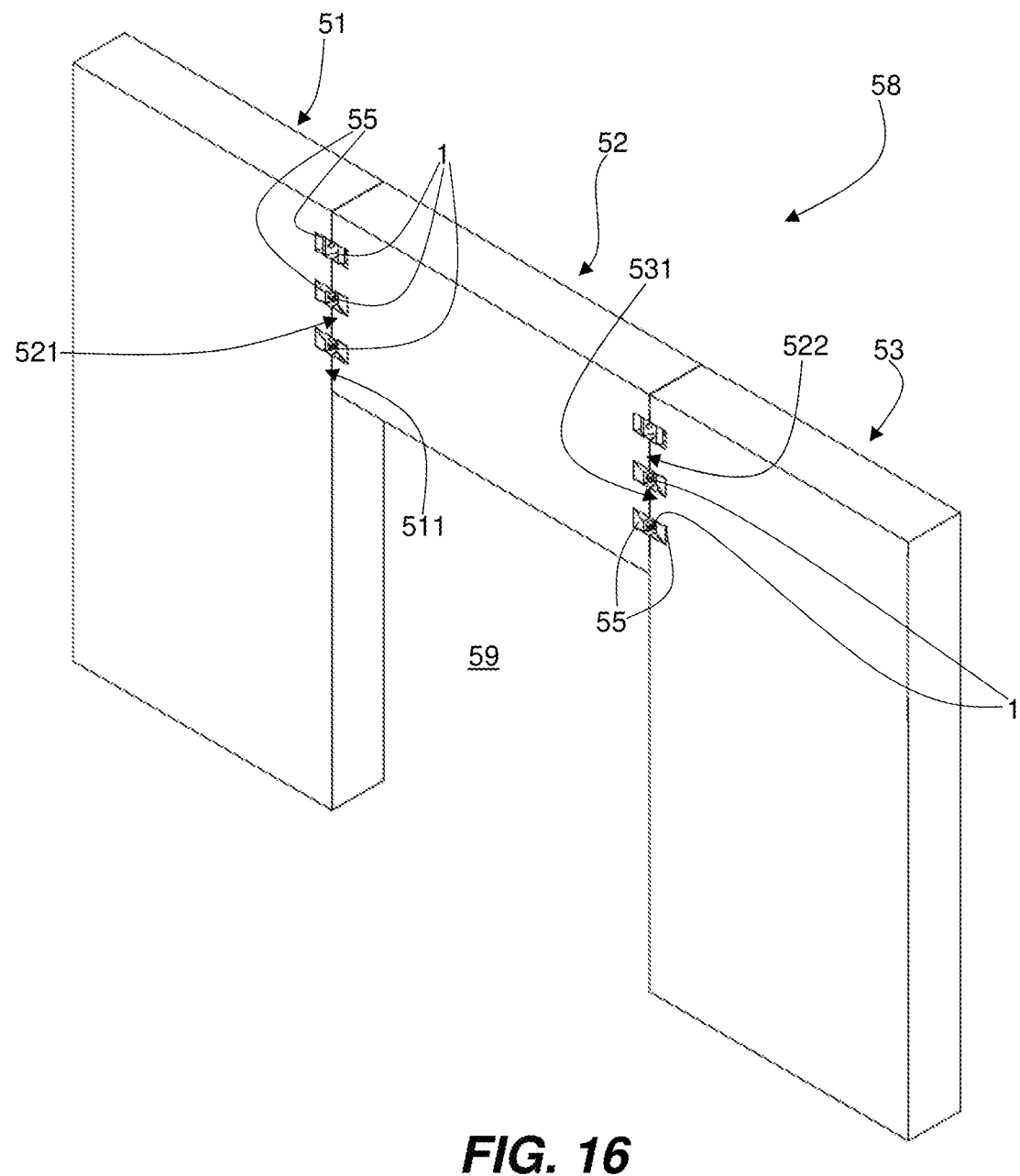
FIG. 16 shows a perspective view of an assembly comprising three panels connected by joint members according to this disclosure, wherein in particular that assembly is a wall with an opening for a door.

FIG. 16 shows a wall of wooden panels in which an opening for a door or for a window is present. The differences compared with the prior art shown in FIGS. 1A, 1B and 1C are immediately evident.

The joint member 1 is intended to be positioned in a position interposed between the first panel 51 and the second panel 52, in a joint region 50 in which a side or edge 511 of the first panel 51 is alongside a side or edge 521 of the second panel 52.

The joint member 1 has stiffness and mechanical strength suitable for the purpose of keeping the panels 51, 52 connected to each other in a predetermined position and of transmitting between them the loads acting once installed.

Depending on requirements, the joint member 1 may be made of suitable material such as multi-layered or laminated wood (in particular X-LAM or Cross Laminated Timber), metal, plastic or bioplastic material, composite material (for example carbon fibre). The joint member 1 may be made as a single piece or may be formed by multiple pieces which are joined to each other.

The joint member 1 has a body 20 (which specifically is a rigid, substantially non-deformable body) equipped with at least four connecting portions 21, 22, 23, 24 (which may also be referred to as fixing portions) each having a respective seat 31, 32, 33, 34 intended to receive a respective fixing element. The fixing element is for example a screw 5.

The seats 31, 32, 33, 34 are spaced from each other and, in a plan view of the joint member 1, are positioned at the vertices of a quadrilateral. FIG. 4 shows that plan view, in which moreover a quadrilateral (in particular a rectangle) has been sketched: the vertices of the quadrilateral are at central points of said seats.

Overall, the body 20 substantially has a prismatic shape, with two substantially flat parallel faces 201, 202 (which are parallel to the plane of said plan view). The body 20 has a height between the two parallel faces 201, 202. The connecting portions 21, 22, 23, 24 are contained between the two parallel faces 201, 202; their seats 31, 32, 33, 34 extend in the material between said parallel faces 201, 202 and open onto faces which connect said parallel faces 201, 202.

A first and a second of said connecting portions, labelled with the reference numbers 21 and 22, form a first pair of connecting portions: they are on a first part 27 of the body 20 and are intended to be fixed to the first panel 51. A third and a fourth of said connecting portions, labelled with the reference numbers 23 and 24, form a second pair of connecting portions: they are on a second part 28 of the body 20 and are intended to be fixed to the second panel 52. In particular, each pair is formed by two connecting portions on a same part of the body 20, on the opposite side to the other pair.

Each connecting portion 21, 22, 23, 24 has a first face 41 which, in use, is facing the respective panel 51, 52 (that is to say, facing the panel to which the connecting portion is fixed) and a second face 42 which is on an opposite side to the first face 41.

The second face 42 of the first connecting portion 21 and the second face 42 of the third connecting portion 23 are on a same first side 25 of the body 20 of the joint member 1. The second face 42 of the second connecting portion 22 and the second face 42 of the fourth connecting portion 24 are on a same second side 26 of the body 20 of the joint member 1. The second side 26 is opposite to the first side 25, that is to say, is on an opposite side of the body 20.

In other words: the first connecting portion 21 and the third connecting portion 23 are on a same part of the body 20 but are intended to be fixed to different panels; the second connecting portion 22 and the fourth connecting portion 24 are on a same part (opposite to that of the connecting portions 21, 23) of the body 20 but are intended to be fixed to different panels.

Each seat 31, 32, 33, 34 is, or comprises, a through hole which extends in a thickness of the respective connecting portion 21, 22, 23, 24 between the first face 41 and the second face 42. The through hole has a central longitudinal axis 30. In practice, the respective fixing element (in particular a screw 5) is insertable into the seat from the side on which the second face 42 is and, coming out of the seat on the side on which the first face 41 is, the fixing element engages with the respective panel.

In particular, the seats 31, 32, 33, 34 open onto the first faces 41 in positions substantially coplanar with each other in a plane parallel to the parallel faces 201, 202 of the body 20. More specifically, each seat 31, 32, 33, 34 opens onto the first face 41 in a position halfway up the height of the body 20, that is to say, equidistant from the two parallel faces 201, 202.

Depending on structural and assembling requirements: the through hole may be a smooth hole, into which the screw 5 is simply insertable with substantially free sliding and therefore the transfer of the longitudinal forces between the joint member 1 and the screw 5 is only at the head of the screw 5; as an alternative, the through hole may be a threaded hole, having a thread engageable by the thread of the screw 5, therefore the transfer of longitudinal forces between the joint member 1 and the screw 5 is also along the whole thread of the threaded hole. The choice between one or the other solution may also depend on the forces in play, to which the assembly is subjected once installed, and on the material used to make the joint member 1.

As will be made clearer below, in use the first faces 41 are facing towards the respective panels and are hidden by the latter, whilst the second faces 42 remain free and accessible for an operator who is assembling the assembly (or structure) comprising the panels. Therefore the operator, acting from the first side 25 and from the second side 26 of the body 20, can position the fixing elements 5 in the respective seats 31, 32, 33, 34 and, by the fixing elements 5, fix the joint member 1 to the first panel 51 and to the second panel 52.

In the embodiments illustrated, with reference to the first side 25 and to the second side 26 of the body 20, the second faces 42 of the connecting portions on the same side form a cavity between them: a first cavity 35 is present between the second faces 42 of the first connecting portion 21 and of the third connecting portion 23; a second cavity 36 is present between the second faces 42 of the second connecting portion 22 and of the fourth connecting portion 24. For example, as shown in FIGS. 2 to 9, the second faces 42 of the connecting portions on the same side are at least partly facing towards each other: they are inclined relative to each other and form an angle between them in the plan view (see FIG. 4).

The seats 31, 32, 33, 34 open onto the second faces 42 and face those cavities 35, 36, which in use are interposed between the alongside sides or edges 511, 521 of the first panel 51 and of the second panel 52. The heads of the fixing elements 5 may remain housed in those cavities 35, 36 and do not project from the respective side 25, 26 of the body 20.

For each connecting portion, an extension of the central longitudinal axis 30 of the respective seat beyond the second face 42 does not intersect the other connecting portion on the same side 25, 26. This feature is useful for facilitating assembling operations: the operator is not obstructed by the other connecting portion during insertion of a fixing element 5 into the seat or during use of a tool such as a drill for making a corresponding hole in the panel or a screwdriver or a screwer for screwing the fixing element 5 into the seat and into the panel.

Said feature is obtainable with a suitable shape of the connecting portions, for example by suitably selecting the position of the seats, the inclination of their longitudinal axis and the relative inclination between the second faces of the connecting portions.

In the embodiment illustrated, said feature is also obtained with the following device: the other connecting portion on the same side 25, 26 has a hollow 29 (or a hole) through which said extension of the central longitudinal axis 30 travels or passes. In practice, the extension of the central longitudinal axis 30 meets and travels through that hollow 29 (corresponding to an absence of material) rather than through the material which constitutes the body 20. As regards the first pair and the second pair of connecting portions, in the embodiment illustrated the first faces 41 of the connecting portions of the same pair between them form a housing which, in use, is intended to receive a region of the side or edge of the respective panel: a first housing 37 is present between the first faces 41 of the first connecting portion 21 and of the second connecting portion 22 and is intended to receive a region of the side or edge 511 of the first panel 51; a second housing 38 is present between the first faces 41 of the third connecting portion 23 and of the fourth connecting portion 24 and is intended to receive a region of the side or edge 521 of the second panel 52. In practice, each pair forms a sort of fork.

For example, as shown in FIGS. 2 to 9 and similarly to what is described above for the cavities 35, 36 formed between the second faces 42, the first faces 41 of the connecting portions of the same pair are at least partly facing towards each other: they are inclined relative to each other and form an angle between them in the plan view (see FIG. 4).

In the embodiment illustrated, the sides 511, 521 of the panels 51, 52 have hollows or recesses 55, for example obtained by milling, which are intended to receive the respective connecting portions of the joint member 1. In particular, each hollow or recess 55 has a region with a shape that substantially matches the respective housing 37, 38 in which the region is received in the assembled condition. See specifically FIG. 10 in combination with FIG. 4.

That is useful for increasing the contact surface area and the strength of the constraint between the panel and the joint member 1, thereby producing a more secure and stronger connection.

As can be seen in the figures for the embodiments illustrated, the connecting portions 21, 22, 23, 24 are wings (or arms) which extend from a central region of the body 20 of the joint member 1. In particular, the connecting portions are in a radial arrangement.

In the plan view, as shown in FIG. 4, the joint member 1 substantially has the shape of an X or a cross, where the connecting portions form the arms of that shape. In other words, the two parallel faces 201, 202 of the body 20 have that shape.

An X or cross shape appears to be advantageous both as regards the use of the joint member 1 (see what has already been mentioned above in relation to the cavities 35, 36 and to the housings 37, 38), and as regards production of the joint member 1 itself, since this allows the consumption of material and the weight of the joint member 1 obtained to be limited.

For the first pair and the second pair of connecting portions, in said plan view the projections of the central longitudinal axes 30 of the seats of the connecting portions of the same pair converge in the direction coming out of the first faces 41, that is to say, they converge with each other towards the respective panel. With regard to this, in addition to FIG. 4, FIG. 9 should also be viewed, where the screws 5 housed in the seats extend along the central longitudinal axes 30 of the self-same seats. In practice, the screws 5 which fix the joint member 1 to a panel are not parallel to each other and they converge, engaging oblique stretches of the thickness of the panel. That is useful for achieving a satisfactory distribution of the longitudinal and shearing stresses and of the twisting moments acting on the joint. Moreover, the insertion of the screws 5 into the seats is easy thanks to the inclination of the central longitudinal axes 30 beyond the second faces 42.

Moreover, again for the first pair and the second pair of connecting portions, the central longitudinal axes 30 of the seats of the connecting portions of the same pair are slanting (i.e., they are not in a same plane) relative to each other and have projections which, in a view orthogonal to said plan view, diverge in the direction coming out of the first faces 41, that is to say, they diverge towards the respective panel. With regard to this, FIG. 8 should be viewed, where the screws 5 housed in the seats extend along the central longitudinal axes 30 of the self-same seats.

Basically, the fixing elements 5 in the seats 31, 32, 33, 34 extend along the respective central longitudinal axes 30, so that the fixing elements 5 of the connecting portions of the same pair are slanting (i.e., they are not in a same plane) relative to each other and have projections which, in the view orthogonal to said plan view, diverge in the direction coming out of the first faces 41.

This is useful, on one hand, for improving the resistance of the joint to longitudinal and shearing stresses and to twisting moments, and on the other hand for preventing the two screws 5 from being able to interfere with each other if they converge in plan view (as described above).

One method for use of the joint member 1 is described below.

The joint member 1 is usable for joining, that is to say, for mechanically connecting, a first panel 51 and a second panel 52 to each other.

The first panel 51 and the second panel 52 are positioned side by side, so that a side or edge 511 of the first panel 51 is alongside a side or edge 521 of the second panel 52. In practice, a thin face of the first panel 51 (that is to say, the face substantially corresponding to the thickness of the panel and which connects the two opposite main faces) is facing towards a thin face of the second panel 52. If the panels have the same thickness, the main faces of one panel are substantially a continuation of the main faces of the other panel.

The joint member 1 is positioned in a position interposed between the first panel 51 and the second panel 52 (in particular between their sides or edges 511, 521) in the joint region 50.

The connecting portions 21, 22, that is to say, the connecting portions of the first pair, are fixed to the first panel 51 by respective fixing elements 5 in the seats 31, 32; the connecting portions 23, 24, that is to say, the connecting portions of the second pair, are fixed to the second panel 52 by respective fixing elements 5 in the seats 33, 34.

Therefore, an assembly 57 is obtained, comprising the panels 51, 52, one or more joint members 1 and a plurality of fixing elements 5.

In particular, in order to join the two panels 51, 52 it is possible to use a plurality of joint members 1, which are positioned one after another along the sides or edges 511, 521 of the panels. FIGS. 10 to 16 for example show a joint between the panels 51, 52 which is produced with three joint members 1, spaced from each other and evenly distributed along the joint region 50. As already indicated above, in the embodiment illustrated the side or edge 511 of the first panel 51 and the side or edge 521 of the second panel 52 have respective hollowed regions (that is to say, hollows or recesses 55) in the thickness of the self-same panel for receiving a corresponding part of the joint member 1 (that is to say, the corresponding connecting portions 21, 22, 23, 24).

That allows the panels 51, 52 to be drawn near each other so that the side or edge 511 of the first panel 51 is substantially adjacent to (or even in contact with) the side or edge 521 of the second panel 52, except in said hollowed regions 55 where the joint member 1 is located. Therefore, between the two panels 51, 52 there may be a substantial surface continuity, except at the hollowed regions 55.

It should be noticed that each hollowed region 55 opens both on the side or edge (that is to say, on said thin face), and on the two opposite faces (or main faces) of the panel. Moreover, the hollowed region 55 may be shaped to match the portion of joint member 1 received in it.

The joint member 1 is positioned in the hollowed regions 55 in such a way that the first side 25 and the second side 26 of the body 20 are on opposite faces of the assembly 57, that is to say, on opposite faces of the panels joined.

Therefore, the first side 25 and the seats 31, 33 are accessible from the side shown in FIGS. 10 to 13, through the openings of the hollowed regions 55 on the face from that side; the second side 26 and the seats 32, 34 are accessible from the other side (which is hidden in those figures) through the openings of the hollow regions 55 on the face from that other side.

The plane of said plan view of the joint member 1 (FIG. 4) is substantially orthogonal to said opposite faces of the assembly 57, that is to say, is substantially orthogonal to the plane of the sheet of FIG. 12. In particular, the parallel faces 201, 202 of the body 20 are substantially orthogonal to said opposite faces of the assembly 57.

The width of the joint member 1 (measured between the sides 25, 26) is roughly equal to (or slightly less than) the thickness of the panels 51, 52 (measured between said opposite faces). Therefore, the joint member 1 occupies practically the whole thickness of the hollowed regions 55, but without projecting from the opposite faces of the assembly 57.

Using a suitable number of joint members 1 it is possible to connect multiple panels to each other. For example the assembly 57 may comprise a third panel 53 and at least one other joint member 1, as shown in FIG. 16.

In addition to the first side or edge 521 to which the first panel 51 is connected, the second panel 52 has a second side or edge 522 which is alongside a side or edge 531 of the third panel 53. The third panel 53 is connected to the second panel 52 by at least one other joint member 1, with methods completely similar to those already described. The second panel 52 is interposed between the first panel 51 and the third panel 53.

The joint member 1 can be used in particular for multi-layered wood or laminated wood panels, in particular of the X-LAM or CLT (Cross Laminated Timber) type.

One specific field of use is the construction of buildings which have wooden walls and/or wooden floors. For example, a wall 58 for a building is formed by a plurality of panels (in particular wooden panels, more specifically multi-layered wood or laminated wood panels, such as X-LAM or CLT) which are connected to each other using joint members 1. That wall 58 therefore comprises at least one assembly 57.

One example of use, which corresponds to what is shown in FIG. 16, relates to a wall 58 for a building, in which the wall 58 is required to have an opening for a door or for a window.

For this purpose at least three panels 51, 52, 53 are used which, as described above, are joined to each other by joint members 1 in such a way that the second panel 52 is interposed between the first panel 51 and the third panel 53.

The panels are selected with sizes such that the first side or edge 521 and the second side or edge 522 of the second panel 52 have a length which is less than the respective sides or edges 511, 531 of the first panel 51 and of the third panel 53, whereby there is an open region 59 between the first panel 51 and the third panel 53. In other words, the second panel 52 has a height which is less than the height of the panels 51, 53.

Once installed, the first panel 51 and the third panel 53 are the lateral uprights of the opening for a door or for a window, whilst the second panel 52 is a crosspiece or an architrave of the opening for a door or for a window. In practice, the opening for a door or for a window is at least one part of said open region 59 or itself corresponds to said open region 59.

Alternative embodiments of a joint member according to this disclosure are shown in FIGS. 17 to 24. Only the differences compared with the first embodiment of FIGS. 2 to 9 are commented on herein, it being understood that all of the other features and methods of use described for the first embodiment are also similarly applicable for these alternative embodiments. In the embodiment of FIGS. 17 to 20, the first faces 41 are curved instead of flat as in the first embodiment. In particular, each first face 41 has a convex surface which may be considered similar to a portion of a cylindrical surface. This embodiment may be useful because making hollows or recesses 55 in the sides of the panels 51, 52, with concave curved surfaces that are also shaped to match the connecting portions, may be easier than hollows with flat surfaces.

Figure 21:
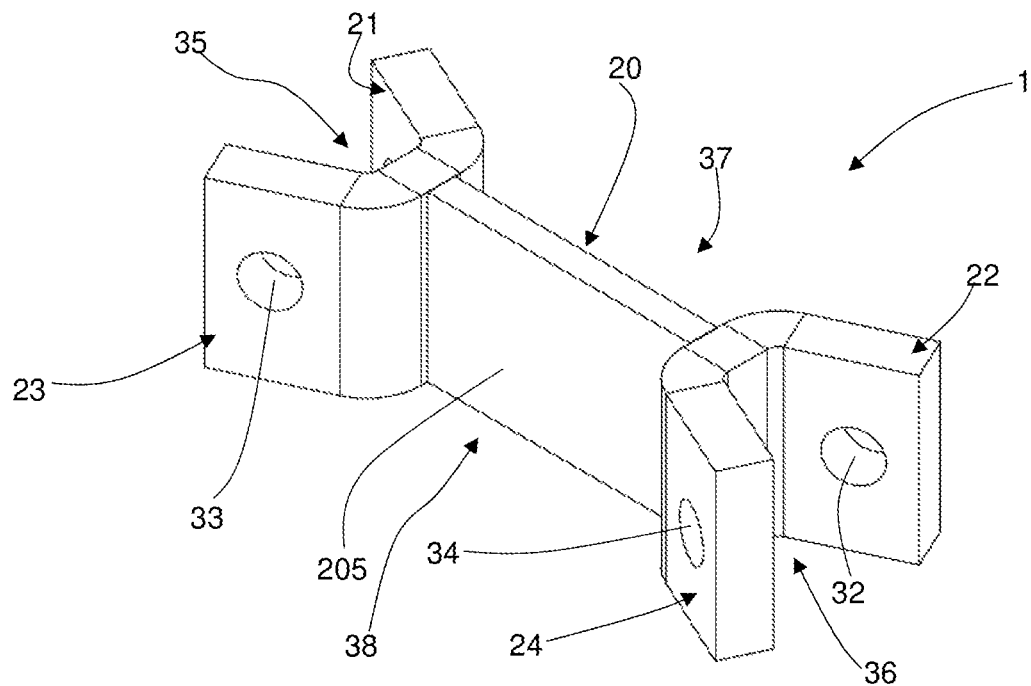
FIG. 21 shows a perspective view of a third embodiment of a joint member according to this disclosure.

In the embodiment in FIG. 21, the body 20 of the joint member has a central region 205 which is elongate, so that the connecting portions in each pair (that is to say, the connecting portions for the same panel) are further away from each other than in the first embodiment. Moreover the central region 205 has flat faces intended to be contained between the sides of the panels. This embodiment may be useful for thicker panels.

Figure 22:
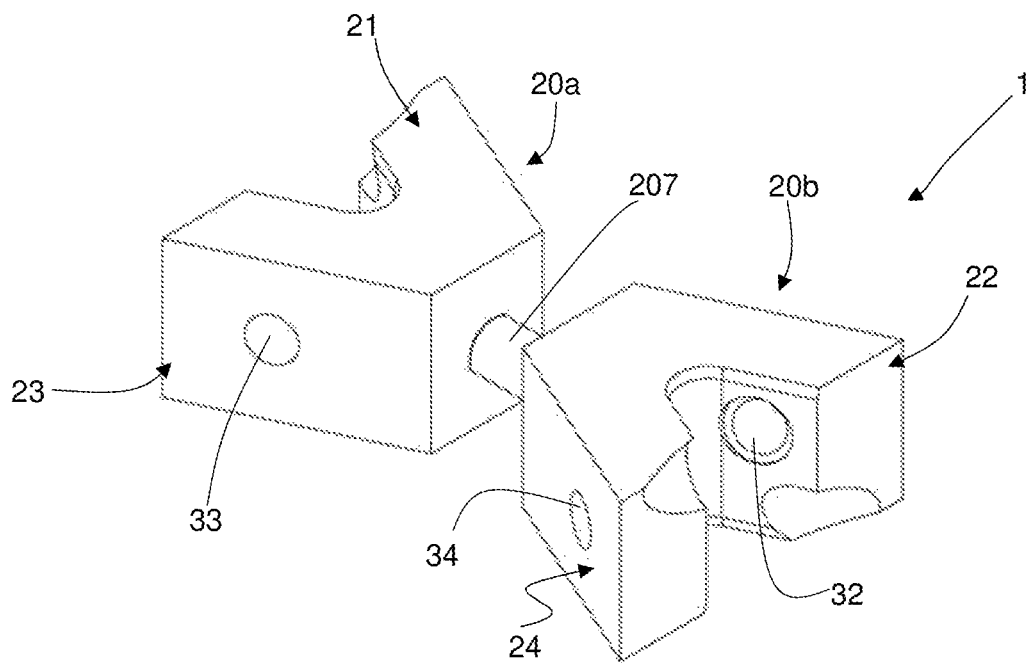
FIG. 22 shows a perspective view of a fourth embodiment of a joint member according to this disclosure.

In the embodiment in FIG. 22, the joint member is formed by two pieces 20a, 20b which are made separately and which, once fitted together, form the body 20. A first piece 20a comprises the first connecting portion 21 and the third connecting portion 23; a second piece 20b comprises the second connecting portion 22 and the fourth connecting portion 24.

Essentially, each piece 20a, 20b is one half of the body 20 of the embodiments previously described: the two halves correspond to the pieces which would be obtained by "cutting" the body 20 with a cutting plane which cuts the housings 37, 38 separating the connecting portions intended to be fixed to the same panel.

The two pieces 20a, 20b are fitted together for example by a threaded bar 207 or a stud (or other connecting element) which allows the distance between the two pieces 20a, 20b to be set at a selected value.

That is useful for adapting the size of the joint member to the thickness of the panels. In other words, the joint members according to the embodiment in FIG. 22 have an adjustable length and therefore they can be used for panels which, on each occasion, have different thickness: compared with the other embodiments, it is not necessary to produce joint members which are different and which have specific dimensions for each panel thickness.

In particular embodiments of a joint member according to this disclosure, the first face of each connecting portion has a stepped shape. The first faces of the connecting portions of the same pair between them form the housing which, in use, is intended to receive the region of the side or edge of the respective panel.

Figure 23:
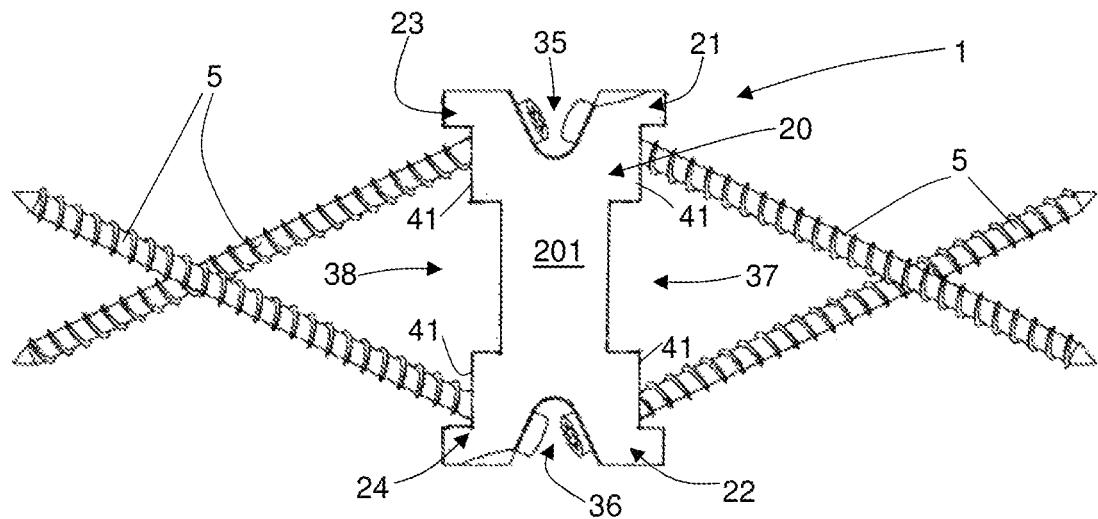
FIG. 23 shows a plan view of a fifth embodiment of a joint member according to this disclosure, equipped with fixing elements.
Figure 24:
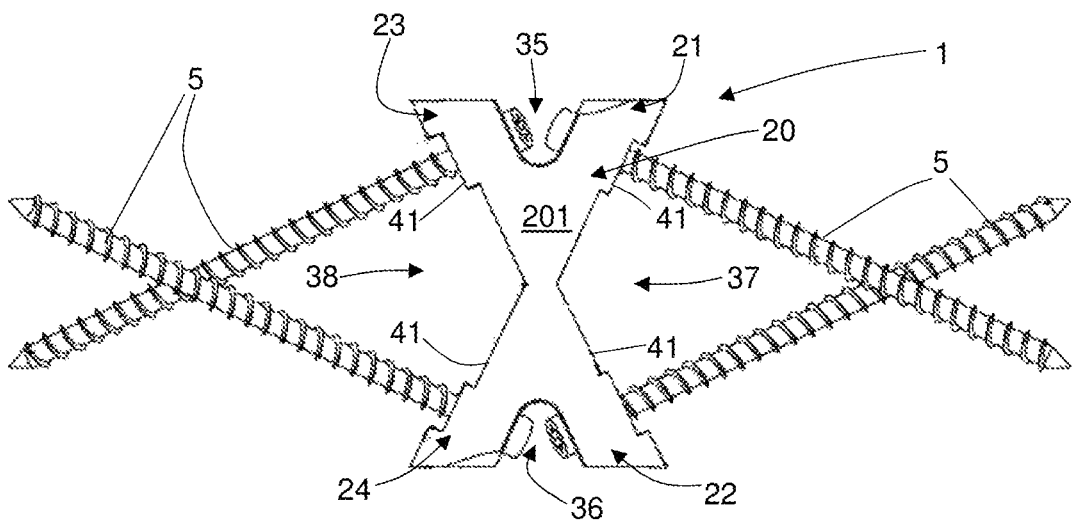
FIG. 24 shows a plan view of a sixth embodiment of a joint member according to this disclosure, equipped with fixing elements.

Examples of those particular embodiments are the embodiments in FIGS. 23 and 24, which are only shown in plan view and equipped with fixing screws 5. The first faces 41 have a stepped shape: as shown in FIGS. 23 and 24, in the plan view the profile of each first face 41 is a jagged line. The housings 37, 38 therefore have a faceted shape which has a plurality of edges. That may be useful for promoting an improved interlocking of the joint member in the respective recesses 55 (shaped to match the housings 37, 38), obtaining better earthquake resistance performance.

Obviously, the differentiating aspects of each embodiment may be combined with each other to obtain other embodiments.

The joint member according to this disclosure has so far been illustrated as usable for producing walls of a building, that is to say, for connecting panels which are substantially vertical.

The joint member is also similarly usable for producing a floor, which is formed by panels (in particular wooden panels, more particularly multi-layered wood or laminated wood panels, such as X-LAM or CLT) which are horizontal, drawn near each other and connected by the joint members. Therefore, a floor which includes the joint members described herein is also subject matter of this disclosure. In order to produce a floor, which could require greater thickness than a wall, the joint members according to the embodiments of FIGS. 21 and 22 may be particularly advisable.

The subject of this disclosure may be modified and adapted in several ways without thereby departing from the scope of the appended claims.

All details may be substituted with other technically equivalent elements and the materials used, as well as the shapes and dimensions of the various components, may vary according to requirements.

The invention claimed is:

1. A joint member (1) for panels, which has a body (20) equipped with at least four connecting portions (21, 22, 23, 24) each having a respective seat (31, 32, 33, 34) intended to receive a fixing element (5), the seats (31, 32, 33, 34) being spaced from each other and, in a plan view of the joint member (1), being positioned at the vertices of a quadrilateral, wherein a first (21) and a second (22) of said connecting portions form a first pair of connecting portions, and wherein a third (23) and a fourth (24) of said connecting portions form a second pair of connecting portions, each connecting portion (21, 22, 23, 24) having a first face (41) and a second face (42) which is on an opposite side to the first face (41), said respective seat (31, 32, 33, 34) being, or comprising, a through hole which extends in a thickness of the connecting portion (21, 22, 23, 24) between the first face (41) and the second face (42) and which has a central longitudinal axis (30), the second face (42) of the first connecting portion (21) and the second face (42) of the third connecting portion (23) being on a same first side (25) of the body (20), the second face (42) of the second connecting portion (22) and the second face (42) of the fourth connecting portion (24) being on a same second side (26) of the body (20), opposite to the first side (25), wherein the joint member (1) is intended to mechanically connect a first panel (51) and a second panel (52) to each other, the joint member (1) being intended to be positioned in a position interposed between the first panel (51) and the second panel (52), in a joint region in which a side or edge (511) of the first panel (51) is alongside a side or edge (521) of the second panel (52), wherein the first connecting portion (21) and the second connecting portion (22) are intended to be fixed to the first panel (51), and the third connecting portion (23) and the fourth connecting portion (24) are intended to be fixed to the second panel (52), wherein, in use, the first face (41) of each connecting portion (21, 22, 23, 24) is facing the respective panel (51, 52).

2. The joint member (1) according to claim 1, wherein, for the first pair (21, 22) and the second pair (23, 24) of connecting portions, the central longitudinal axes (30) of the seats (31, 32, 33, 34) of the connecting portions of the same pair are slanting (i.e., they are not in a same plane) relative to each other and have projections which, in a view orthogonal to said plan view, diverge in the direction coming out of the first faces (41).

3. The joint member (1) according to claim 2, wherein, for the first pair (21, 22) and the second pair (23, 24) of connecting portions, in said plan view the projections of the central longitudinal axes (30) of the seats (31, 32, 33, 34) of the connecting portions of the same pair converge in the direction coming out of the first faces (41).

4. The joint member (1) according to claim 1, wherein, for the first pair (21, 22) and the second pair (23, 24) of connecting portions, the first faces (41) of the connecting portions of the same pair form a housing (37, 38) between them which, in use, is intended to receive a region of the side or edge (511, 521) of the respective panel (51, 52).

5. The joint member (1) according to claim 4, wherein, for the first pair (21, 22) and the second pair (23, 24) of connecting portions, the central longitudinal axes (30) of the seats (31, 32, 33, 34) of the connecting portions of the same pair are slanting (i.e., they are not in a same plane) relative to each other and have projections which, in a view orthogonal to said plan view, diverge in the direction coming out of the first faces (41).

6. The joint member (1) according to claim 5, wherein, for the first pair (21, 22) and the second pair (23, 24) of connecting portions, in said plan view the projections of the central longitudinal axes (30) of the seats (31, 32, 33, 34) of the connecting portions of the same pair converge in the direction coming out of the first faces (41).

7. The joint member (1) according to claim 1, wherein, for the first side (25) and the second side (26) of the body (20), the second faces (42) of the connecting portions on the same side between them form a cavity (35, 36).

8. The joint member (1) according to claim 7, wherein, for each connecting portion (21, 22, 23, 24), an extension of the central longitudinal axis (30) of the seat (31, 32, 33, 34) beyond the second face (42) does not intersect the other connecting portion on the same side (25, 26), and wherein the other connecting portion on the same side (25, 26) has a hollow or a hole (29) through which said extension of the central longitudinal axis (30) passes.

9. The joint member (1) according to claim 1, wherein said connecting portions (21, 22, 23, 24) are wings or arms which extend from a central region of the body (20), in particular wherein, in said plan view of the joint member (1), the joint member (1) substantially has the shape of an X or a cross.

10. An assembly (57) comprising a first panel (51), a second panel (52), at least one joint member (1) according to claim 1, a plurality of fixing elements (5), wherein a side or edge (511) of the first panel (51) is alongside a side or edge (521) of the second panel (52), the joint member (1) is in a position interposed between the first panel (51) and the second panel (52) in a respective joint region, the first face (41) of each connecting portion (21, 22, 23, 24) facing the respective panel (51, 52), the connecting portions (21, 22) of the first pair being fixed to the first panel (51) by respective fixing elements (5) in their seats (31, 32), the connecting portions (23, 24) of the second pair being fixed to the second panel (52) by respective fixing elements (5) in their seats (33, 34), so that the at least one joint member (1) mechanically connects the first panel (51) and the second panel (52) to each other.

11. The assembly (57) according to claim 10, wherein the side or edge (511) of the first panel (51) and the side or edge (521) of the second panel (52) have respective hollows or recesses (55) made in the thickness of the panel (51, 52) for receiving a corresponding part of the at least one joint member (1), so that the side or edge (511) of the first panel (51) is substantially adjacent to the side or edge (521) of the second panel (52) except at said hollows or recesses (55).

12. The assembly (57) according to claim 10, wherein, for the first pair (21, 22) and the second pair (23, 24) of connecting portions of the at least one joint member (1), the central longitudinal axes (30) of the seats (31, 32, 33, 34) of the connecting portions of the same pair are slanting (i.e., they are not in a same plane) relative to each other and have projections which, in a view orthogonal to said plan view, diverge in the direction coming out of the first faces (41), wherein the fixing elements (5) in the seats (31, 32, 33, 34) extend along the respective central longitudinal axes (30), so that the fixing elements (5) of the connecting portions of the same pair are slanting (i.e., they are not in a same plane) relative to each other and have projections which, in the view orthogonal to said plan view, diverge in the direction coming out of the first faces (41).

13. The assembly (57) according to claim 10, wherein, for the first pair (21, 22) and the second pair (23, 24) of connecting portions of the at least one joint member (1), the first faces (41) of the connecting portions of the same pair form a housing (37, 38) between them which receives a region of the side or edge (511, 521) of the respective panel (51, 52).

14. The assembly (57) according to claim 10, wherein the first side (25) of the body (20) of the joint member (1) and the second side (26) of the body (20) of the joint member (1) are on opposite faces of the assembly (57), and wherein the plane of said plan view of the joint member (1) is substantially orthogonal to said opposite faces.

15. The assembly (57) according to claim 10, comprising a plurality of said joint members (1), which are positioned one after another along the sides or edges (511, 521) of the panels (51, 52), each joint member (1) being in a position interposed between the first panel (51) and the second panel (52) and being fixed to the panels (51, 52) by respective fixing elements (5).

16. The assembly (57) according to claim 10, wherein the first panel (51) and the second panel (52) are multi-layered wood or laminated wood panels, in particular of the X-LAM or CLT (Cross Laminated Timber) type.

17. The assembly (57) according to claim 10, comprising a third panel (53) and at least one other of said joint members (1), wherein the second panel (52) has a first side or edge (521) and a second side or edge (522) which is opposite to the first side or edge (521), the first side or edge (521) of the second panel (52) being alongside the side or edge (511) of the first panel (51), the second side or edge (522) of the second panel (52) being alongside a side or edge (531) of the third panel (53), the third panel (53) being connected to the second panel (52) by said at least one other joint member (1), the second panel (52) being interposed between the first panel (51) and the third panel (53).

18. A wall (58) for a building or a floor for a building, formed by a plurality of panels (51, 52, 53) and comprising at least one assembly (57) according to claim 10.

19. A wall (58) fora building, formed by a plurality of panels (51, 52, 53) and comprising at least one assembly (57) according to claim 17, wherein the first side or edge (521) and the second side or edge (522) of the second panel (52) have a length which is less than the respective sides or edges (511, 531) of the first panel (51) and of the third panel (53), whereby there is an open region (59) between the first panel (51) and the third panel (53), the first panel (51) and the third panel (53) being lateral uprights of an opening for a door or for a window, the second panel (52) being a crosspiece or an architrave of said opening for a door or for a window, said opening for a door or for a window being at least one part of said open region (59).

\* \* \* \* \*